United States Patent [19]
Hughes et al.

[11] Patent Number: 5,687,317
[45] Date of Patent: Nov. 11, 1997

[54] DISTRIBUTED COMPUTER SYSTEM PROVIDING SIMULTANEOUS ACCESS TO A PLURALITY OF USERS

[75] Inventors: Philip Thomas Hughes, Longstanton; Tony Plant, Harlow, both of United Kingdom

[73] Assignee: Northern Telecom Limited, Montreal, Canada

[21] Appl. No.: 658,706

[22] Filed: Jun. 5, 1996

Related U.S. Application Data

[63] Continuation of Ser. No. 142,877, Oct. 25, 1993, abandoned.

[30] Foreign Application Priority Data

Oct. 28, 1992 [GB] United Kingdom ............... 9222645.5

[51] Int. Cl.$^6$ ................................................. G06F 13/00
[52] U.S. Cl. ..................... 395/200.03; 395/650; 395/700
[58] Field of Search ....................... 395/200.2, 726, 395/200.03, 200.04, 200.19, 200.11, 53, 331

[56] References Cited

U.S. PATENT DOCUMENTS

| | | | |
|---|---|---|---|
| 5,109,515 | 4/1992 | Laggis et al. | 395/725 |
| 5,128,878 | 7/1992 | Gore et al. | 395/162 |
| 5,136,708 | 8/1992 | Lapourtre et al. | 395/650 |
| 5,167,035 | 11/1992 | Mann et al. | 395/575 |
| 5,204,954 | 4/1993 | Hammer et al. | 395/425 |
| 5,392,400 | 2/1995 | Berkowitz et al. | 395/200.01 |

*Primary Examiner*—Mehmet B. Geckil
*Attorney, Agent, or Firm*—Lee, Mann, Smith, McWilliams, Sweeney & Ohlson

[57] ABSTRACT

A distributed computer system is provided with a listener system interposed between the application server and the surface interfaces of the system. The listener system supervises processing of user entered commands and provides substantially simultaneous feedback of system status and progress of the system response to a command to all users. This allows system users to work simultaneously on a common document.

3 Claims, 2 Drawing Sheets

DISTRIBUTED COMPUTER SYSTEM PROVIDING SIMULTANEOUS ACCESS TO A PLURALITY OF USERS

This application is a continuation of application Ser. No. 142,877, filed Oct. 25, 1993, now abandoned.

This invention relates to a computer network in which a plurality of users are provided with access to computer applications provided by the network in an interactive manner.

BACKGROUND OF THE INVENTION

In interactive computing a certain amount of software comprising a program is dedicated to presenting information to and receiving information from the user of the program. It is common for most interactive programs to have graphical user interfaces (GUI). This means that instead of typing strings of character commands at the keyboard in response to a prompt from the program, the user, for example, can select commands from menus drawn on the computer screen. The control of the appearance and disappearance of these menus and the selection of items in them is done by means of mouse. This is a device which continuously sends positional information to the computer which information is translated to a position on the screen. For example, in a wordprocessor program, the user-interface is responsible for presenting a view of the document being worked upon, whilst simultaneously accepting text editing commands in the form of mouse button clicks and keyboard key presses from the author and displaying the effect of these on the document.

A common term used in this area is "event". This term describes the happenings relating to the user-interface. For example, the pressing and releasing of a mouse button are events. The movement of a mouse pointer so that it crosses a graphical object boundary on the screen is also an event. With increasing sophistication, user interface handling software has become more complex and more modular: there are now emerging standards in this area, both for surface appearance and for the underlying mechanisms used. This means that, instead of having to write user-interface software from scratch each time a program is implemented, the programmer can make use of predefined user-inter face services and concentrate on the underlying program functionality. This is entirely analogous to making of predefined libraries of, for example, numerical application software. In addition to this modularisation development, the increasing use of networked computers has allowed programs, which previously ran on a single computer, to be split up so that various parts can execute on several computers which share network connection. In this, the user-interface software is no exception, and it is common for the user-interface parts of a program to be capable of running on any computer in the network, whilst other parts of the program run on one or more other computers in the network. This has meant that, for example, Computer Aided Design (CAD) programs can be split up so that the user-interface runs on a graphics workstation suited to presenting complex images and graphics, whilst the numerical and data processing parts of the program run on a connected "number-crunching" computer.

An important development in this area has been the introduction of systems which allow access to application programmes by a plurality of users without having to redesign the basic software. This means that groups of people using their computers connected to the network can work simultaneously on a program (for example a CAD tool, or a document) as a team rather than as individuals. What is more, this teamwork can, in principle, take place while the individual members are dispersed over wide locations; as long as they have a suitable computer and network connections.

The introduction of such systems has however been severely restricted by the problem of time delay between a user event and the corresponding display of the system response.

In a conventional non-distributed system, when a user responds to a computer program (e.g. by typing or clicking a mouse button, etc) the time delay between ending the response (e.g. by hitting the return key and the program responding is so small that the user does not notice the time taken to receive the command, process it and display the result. Usually, any delays between the end of a user response and the system responding are due to the time taken to process the user's request. For example, in performing a finite-element computation as in a CAD program. This computational delay is usually allowed-for by the user, since this is a characteristic of such software.

In the case of distributed software, delays due to transmission time between the user interface machine and the server machine become apparent and disruptive to the use of the software. This is particularly critical in the case of multi-user software; i.e. when several users are synchronously sharing the same application, and are required to be continuously aware of each other's use of the application.

The time delays that are inherent in currently available systems precludes efficient simultaneous use.

The object of the invention is to minimise or to overcome this disadvantage.

SUMMARY OF THE INVENTION

According to the invention there is provided a distributed computer system including a central computer, an application server associated with the central computer, a plurality of local computers each coupled to the central computer and each having means including a user interface whereby to provide user access, and a listener system as hereinafter defined interposed between the application server and each said user interface, wherein said listener system has an application listener associated with the application server, and a plurality of surface listeners one associated with each said user interface, and wherein said listener system is adapted to provide, in response to a command from any one system user, substantially simultaneous feedback to all system users on the status and progress of the system response to that command.

According to the invention there is further provided a distributed computer system adapted to provide simultaneous interactive access to plurality of users, the system including a first computer, an application server associated with the first computer, a plurality of further computers each in communication with the first computer and each having means including a user interface whereby to provide user access to the system, and a listener system interposed between the application server and each said user interface, wherein the listener system comprises an application listener associated with the application server and a plurality of surface listeners one associated with each said user interface, wherein each said surface listener is adapted to receive commands from a user or from the application server and to direct a corresponding request signal to the application listener, wherein, in response to the request signal, the application listener causes all surface listeners to switch to a busy condition and transmits that request to the application server for processing the request, wherein, on completion of said processing, the application listener relays the result of that processing to that surface listener originating the request and causes all surface listeners to generate to their user an indication of completion of the processing whereby to provide substantially simultaneous feedback to all system users of the status and progress of the system responses to user commands.

According to the invention there is further provided a distributed computer system adapted to provide simultaneous interactive access to a plurality of users, the system including a first computer, an application server associated with the first computer, a plurality of further computers each in communication with the first computer whereby to access the application server and each having means including a user interface whereby to provide user access to the system, and a listener system interposed between the application server and each said user interface, wherein the listener system comprises an application listener associated with the application server and a plurality of surface listeners are associated with each said user interface, wherein the application listener and the surface listeners each have a first free condition and a second busy condition, wherein each said listener is adapted to respond to both application/user events and listener system events in its free condition and is adapted to respond only to listener system events in its busy condition, wherein, in response to an application/user event at a said surface listener, that surface listener passes the event to the application listener, wherein, in response to that event, the application listener enters its busy condition, generates a listener system event causing all the surface listeners to enter their busy condition and passes the event to the application server for processing, wherein the result of said processing is returned to the originating surface listener by the application listener and the application listener generates a further listener system event whereby to reset all surface listeners to their free condition, the system being such that substantially simultaneous indication is provided to all system users of the status and progress of the system response to user interaction with the system.

BRIEF DESCRIPTION OF THE DRAWINGS

An embodiment of the invention will now be described with reference to the accompanying drawings in which.

DESCRIPTION OF PREFERRED EMBODIMENT

Figure 1:
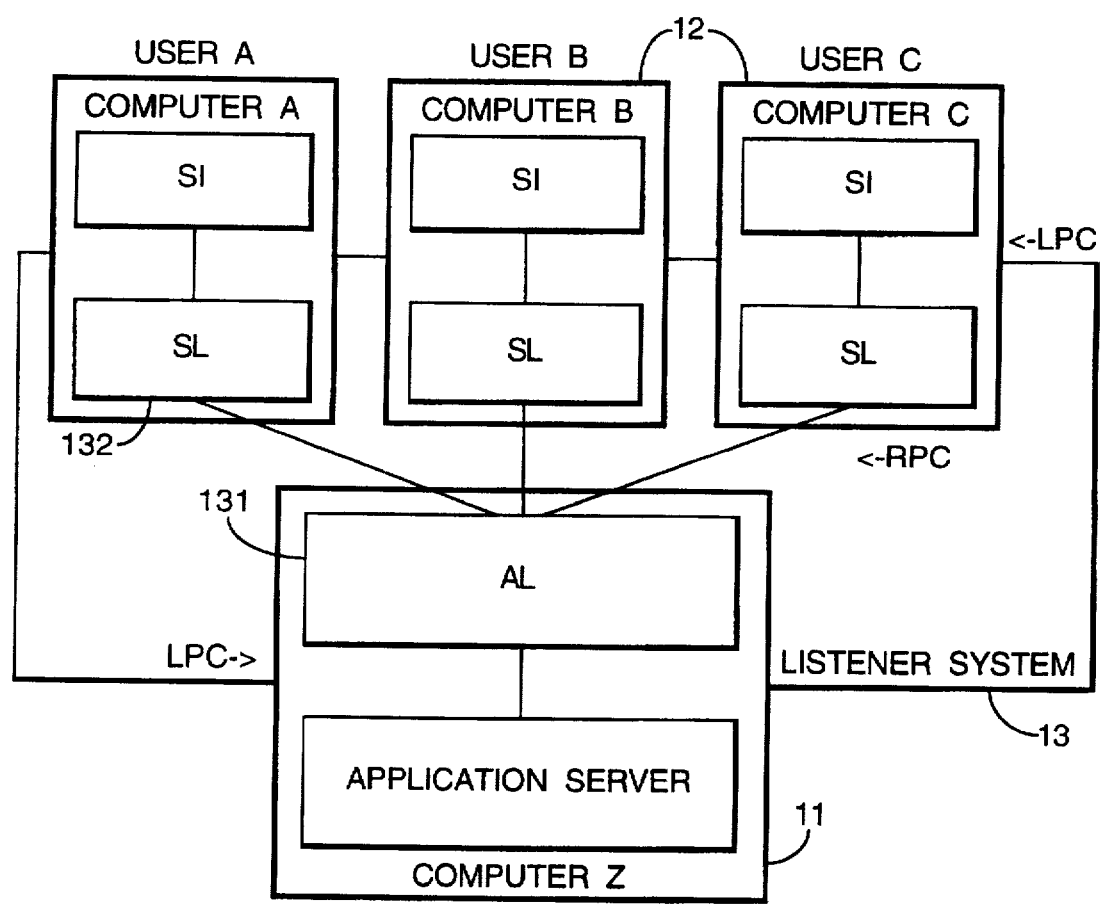
FIG. 1 illustrates a distributed system according to the invention.

Referring to FIG. 1, the system includes a first computer 11 on which, in use, an application server is running and which may be adapted e.g. to numerical and/or data processing. The first computer 11 is in communication via the network with a plurality of further computers 12 each of which may comprise e.g. a graphics workstation. Each further computer 12 provides a system interface whereby interactive communication between a user and the system may be effected.

A listener system 13 is interposed between the application server and the system interfaces. This supervises and allows multiple simultaneous use of the application server.

The listener system comprises an application listener 131 associated with the application server and a plurality of surface listeners 132 each associated with or running on a corresponding further computer 12. In the embodiment of FIG. 1, three further computers are shown, but it will be appreciated that the technique will be applicable to a smaller or larger number of users.

The listener system provides the following functions:

(1) It provides rapid feedback to users that their commands are being processed; this alleviates the tendency of users to overload the surface interface e.g. by repeatedly pressing buttons that apparently do not respond.

(2) It provides rapid feedback to users that a command has been processed, and whether it was successful or not.

(3) It provides feedback to users other than the one who has just entered the command on the status of the system's handling of the command. That is, others are informed who entered a command, and whether the command processing is in-progress or complete.

(4) It manages user-interface input and output so that: the atomicity of server operations is respected (for example, cut-select-paste is an atomic operation) and that users can always attribute the results or effects of a command to the command itself.

Wherever possible, this management is effected by means of automatic sensing of user interface events, rather than by users having to perform explicit actions.

Figure 2:
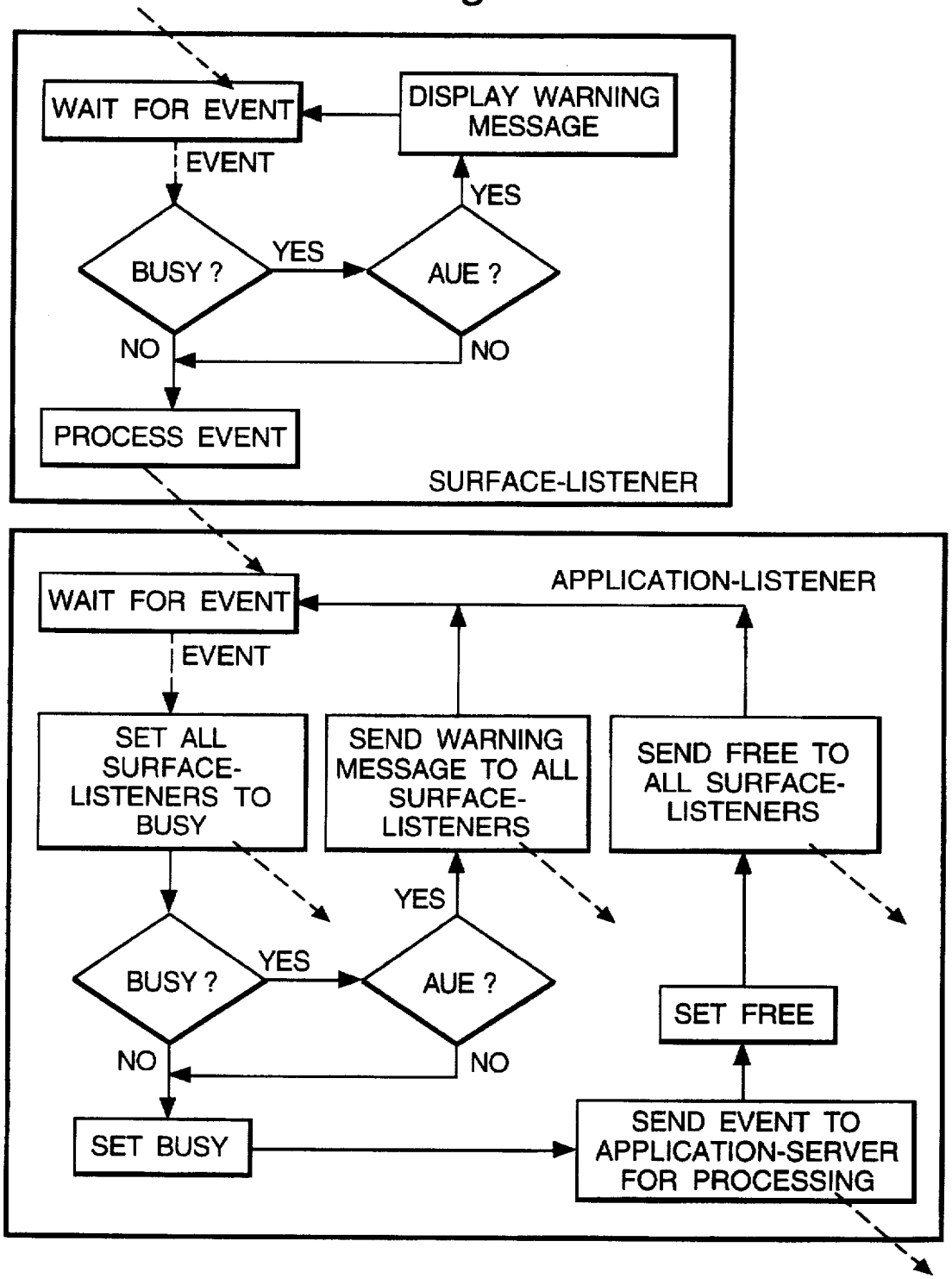
FIG. 2 is a flow-sheet illustrating the operation of the system of FIG. 1.

There now follows a description of the operation of the listener system. Reference is directed to FIG. 2 of the accompanying drawings which comprise a schematic flow chart of the system operation. It will be appreciated that the flow chart of FIG. 2 has, in the interests of clarity, been simplified to show only those features necessary for the understanding of the invention.

In the following description we distinguish two types of event: application/user-events (AUE) generated by the user and the application server, and listener-system events (LSE) which are generated by the internal components of the listener-system. AUEs pass into and out of the listener system, whereas, LSEs are confined within the listener system. The unqualified term "event" is used to mean an AUE or LSE where the distinction is of no relevance. The term "message" as used in the following description may indicate a text message, or some other sign appearing on the user interface, for example highlighting or an icon.

The Surface Listener

Each surface listener may be in one of two states: BUSY or FREE. In the FREE state a surface listener can accept any input events. In the BUSY state, broadcast LSEs are processed but AUEs are rejected and the surface informs the local user of this by means of a suitable message. When the state of a surface listener changes, it always notifies its associated user by means of a suitable message, in principle, giving the following information:

1. Current state
2. Event causing change
3. User responsible

The Application Listener

The application listener may also be in one of two states: BUSY or FREE. Like the surface listeners in the FREE state the application listener will accept any events, but in the BUSY state will only process LSEs; AUEs are rejected. The application listener state may be changed from BUSY to FREE by the following events:

1. A return of a remote procedure call thread from the application server (corresponding to processing AUE completed).

2. An internal time-out. This time-out period is tuneable by the system programmer, based on the delay statistics of the underlying system. Typically, this period is a few second. This mechanism prevents users accidentally locking out others for unreasonable periods of time.

3. An explicit "break lock" event from any user associated with the application listener.

Component Interactions

After a AUE has been accepted from a surface interface by a surface listener (both the application listener and the surface listener must be in the FREE state for this to occur), the surface listener signals the application listener informing it of the event and requesting all other surface listeners be switched to the BUSY state. The application listener now does the following:

1. Signals its connected (other) surface listeners requesting then to change to the BUSY state using an LSE.

2. Passes AUE on to the application server for processing.

3. If the AUE requires a reply, the application listener sets its own state from FREE to BUSY. A BUSY application listener will not accept AUE events from any surface listener.

4. Notifies the original surface listener (by suitable LSE) that the event is being processed. In response to this notification, the surface listener informs the associated user by placing a suitable message on his screen.

When AUE processing is completed by the application server the result is passed to the application listener which then does the following:

1. The result is passed back to the originating surface listener,

2. The other surface listeners are requested to return to the FREE state and inform their users that a result has been returned to the originating user. Note this message has no effect on the state of a surface listener if already in the FREE, state. However, result notification message is still sent to the associated user.

3. The (BUSY) application listener sets itself FREE.

On receiving the above result event a surface listener does the following:

1. The result is passed to the surface or user interface for display/processing according to the particular internal logic of the surface interface, 2. The user is independently notified that the result has been returned, by means of a suitable message.

The system described above is of particular application to computer aided design (CAD) systems where it allows a plurality of users to work on a canton document. It is however also applicable to more general network systems and may also be employed e.g. in a supervisory in a capacity telecommunications network.

We claim:

1. A distributed computer system adapted to provide simultaneous interactive access by a plurality of users, the system including a first computer, an application server associated with the first computer, a plurality of further computers each in communication with the first computer whereby to access the application server via the first computer and each having means including a user interface whereby to provide user access to the system so as to permit simultaneous access by more than one user to a document, and a listener system responsive to user generated events interposed between the application server and each said user interface, wherein the listener system comprises an application listener associated with the application server and a plurality of surface listeners one associated with each said user interface, wherein the application listener and surface listeners each have a first free condition and a second busy condition, wherein each said listener is responsive to both application and user events in its free condition, wherein each said surface listener has first processor means responsive to an application event or a user event at that surface listener for relaying that event to the application listener, wherein the application listener has switch means responsive to a said relayed event for switching the application listener from its free condition to its busy condition, wherein the application listener has signalling means responsive to the switching to its busy condition for sending a signal to all said surface listeners so as to cause each said surface listener to enter its busy condition and to provide to the respective further computer a message indicative of the change in condition and of the nature and origin of the event causing change in condition, wherein the application listener has second processor means responsive to the switching from its free condition to its busy condition for relaying the corresponding event to the application server for processing, for relaying the result of said processing to the originating surface listener and for resetting all surface listeners to their free condition, and wherein each said surface listener has means responsive to the change from its busy condition, to its free condition for notifying its respective further computer that said processing is completed whereby to provide substantially simultaneous indication to all system users of the status and progress of the system response to user interaction with the system and to permit a number of said users to work together on a single document and ensure that each user of said number of users is made aware of actions performed by others of said number of users.

2. A distributed computer system as claimed in claim 1, wherein the application listener has means for resetting from its busy to its free condition after a predetermined time period.

3. A distributed computer system as claimed in claim 2 and comprising a computer aided design (CAD) system.

* * * * *